US012777085B2

(12) United States Patent
Courvoisier et al.

(10) Patent No.: US 12,777,085 B2
(45) Date of Patent: Oct. 27, 2026

(54) METHOD AND SYSTEM FOR PROCESSING OF A DATA STREAM COMPRISING BATCHES OF PACKETS

(71) Applicant: NANO CORP., Paris (FR)

(72) Inventors: François Courvoisier, Paris (FR); Frederic Le Picard, Paris (FR)

(73) Assignee: NANO CORP., Paris (FR)

( * ) Notice: Subject to any disclaimer, the term of this patent is extended or adjusted under 35 U.S.C. 154(b) by 0 days.

(21) Appl. No.: 18/690,238

(22) PCT Filed: Sep. 7, 2022

(86) PCT No.: PCT/EP2022/074918
§ 371 (c)(1),
(2) Date: May 4, 2026

(87) PCT Pub. No.: WO2023/036847
PCT Pub. Date: Mar. 16, 2023

(65) Prior Publication Data
US 2024/0380805 A1 Nov. 14, 2024

(30) Foreign Application Priority Data
Sep. 7, 2021 (FR) ....................................... 2109380
Sep. 7, 2022 (WO) ................. PCT/EP2022/074915

(51) Int. Cl.
*H04L 65/65* (2022.01)

(52) U.S. Cl.
CPC .................................... *H04L 65/65* (2022.05)

(58) Field of Classification Search
CPC ....... H04L 65/65; H04L 43/026; H04L 43/18; H04L 69/22; H04L 43/04
See application file for complete search history.

(56) References Cited

U.S. PATENT DOCUMENTS

2003/0227917 A1 * 12/2003 Maher, III .......... H04L 47/2441 370/392
2006/0106583 A1 5/2006 Fdida et al.
(Continued)

FOREIGN PATENT DOCUMENTS

EP 1788490 5/2007

OTHER PUBLICATIONS

International Search Report and Written Opinion from related application PCT/EP2022/074915 mailed Dec. 7, 2022.
(Continued)

*Primary Examiner* — Johnny B Aguiar
(74) *Attorney, Agent, or Firm* — GREENBLUM & BERNSTEIN, P.L.C.

(57) ABSTRACT

The processing of a data stream comprising a chain of communication protocols associated with a session comprises the following steps:

receiving (S0) a plurality of batches of data packets (104);
performing (S10), a protocol analysis (DAPD) and validating (S11) an associated session;
calculating (S21) and storing (S22) a digital session fingerprint (HS), and saving a list (LM) of the metadata (MPID) associated with the identified protocols (PID)
generating (S30) at least one trigger (114) having at least one rule for identifying target metadata (MC);
analysing (S40) the metadata (MPID) associated with the identified protocols (PID), and if the data comply with the rule for identifying them, assigning a save status (SV) to the validated session; and
emptying (S60) the temporary memory (108) and saving (S61) all the data packets having a save status (SV).

19 Claims, 11 Drawing Sheets

(56) References Cited

U.S. PATENT DOCUMENTS

| | | | | |
|---|---|---|---|---|
| 2011/0249572 | A1* | 10/2011 | Singhal | H04L 69/22 370/252 |
| 2013/0117847 | A1* | 5/2013 | Friedman | H04L 43/16 709/201 |
| 2013/0232137 | A1* | 9/2013 | Knott | H04L 63/1416 707/722 |
| 2015/0293954 | A1* | 10/2015 | Hsiao | G06F 16/22 715/738 |
| 2016/0112287 | A1* | 4/2016 | Farmer | H04L 41/14 709/224 |
| 2021/0385138 | A1* | 12/2021 | Watson | H04L 9/0891 |
| 2022/0078208 | A1* | 3/2022 | Anderson | G06N 7/01 |

OTHER PUBLICATIONS

International Search Report and Written Opinion from related application PCT/EP2022/074918 mailed Dec. 12, 2022.

* cited by examiner

METHOD AND SYSTEM FOR PROCESSING OF A DATA STREAM COMPRISING BATCHES OF PACKETS

CROSS REFERENCE TO RELATED APPLICATIONS

This application is a U.S. National Stage Application of International application No. PCT/EP2022/074918 filed 7 Sep. 2022, which claims priority of International application No. PCT/EP2022/074915 filed 7 Sep. 2022 and of France Patent Application No. 2109380 filed 7 Sep. 2021, all of which are incorporated by reference herein in their entirety.

BACKGROUND

Electronic and Information Technology (IT) devices are used daily by millions of users around the world for the purposes of communicating and sharing information. Communication between these devices is generally facilitated by a communications network, such as the Internet. Communication between devices is generally based on the well-known seven-layer Open Systems Interconnection (OSI) model, which defines the functions of the different protocol layers without specifying the layer protocols themselves. The seven layers of the OSI model, sometimes referred to here as layer 7 to layer 1, are the application, presentation, session, transport, network, data link and physical layers respectively.

DETAILED DESCRIPTION

Figure 1:
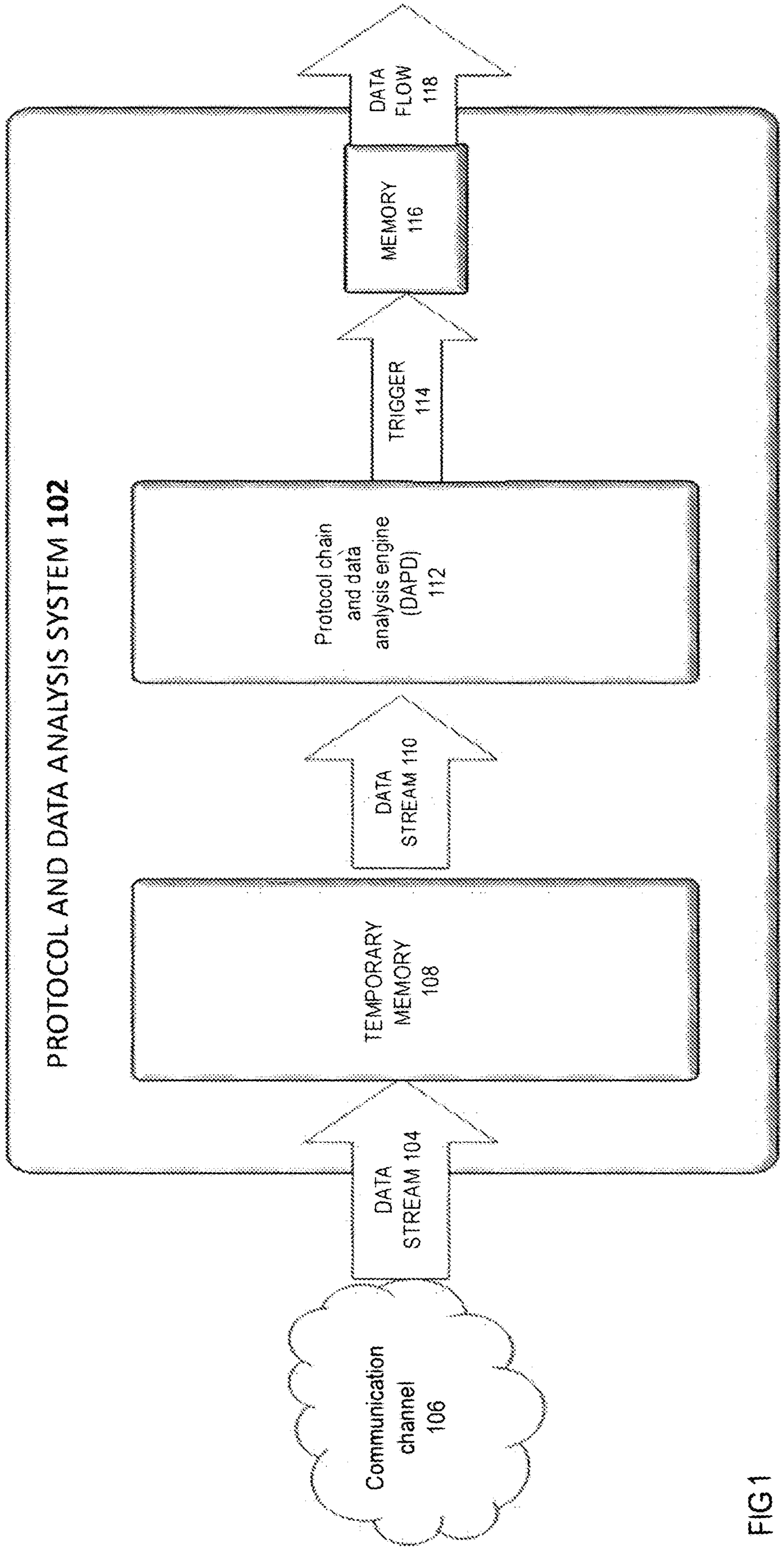
FIG. 1 illustrates a communication environment implementing a data packet analysis system, according to an example of the present invention.
Figure 2:
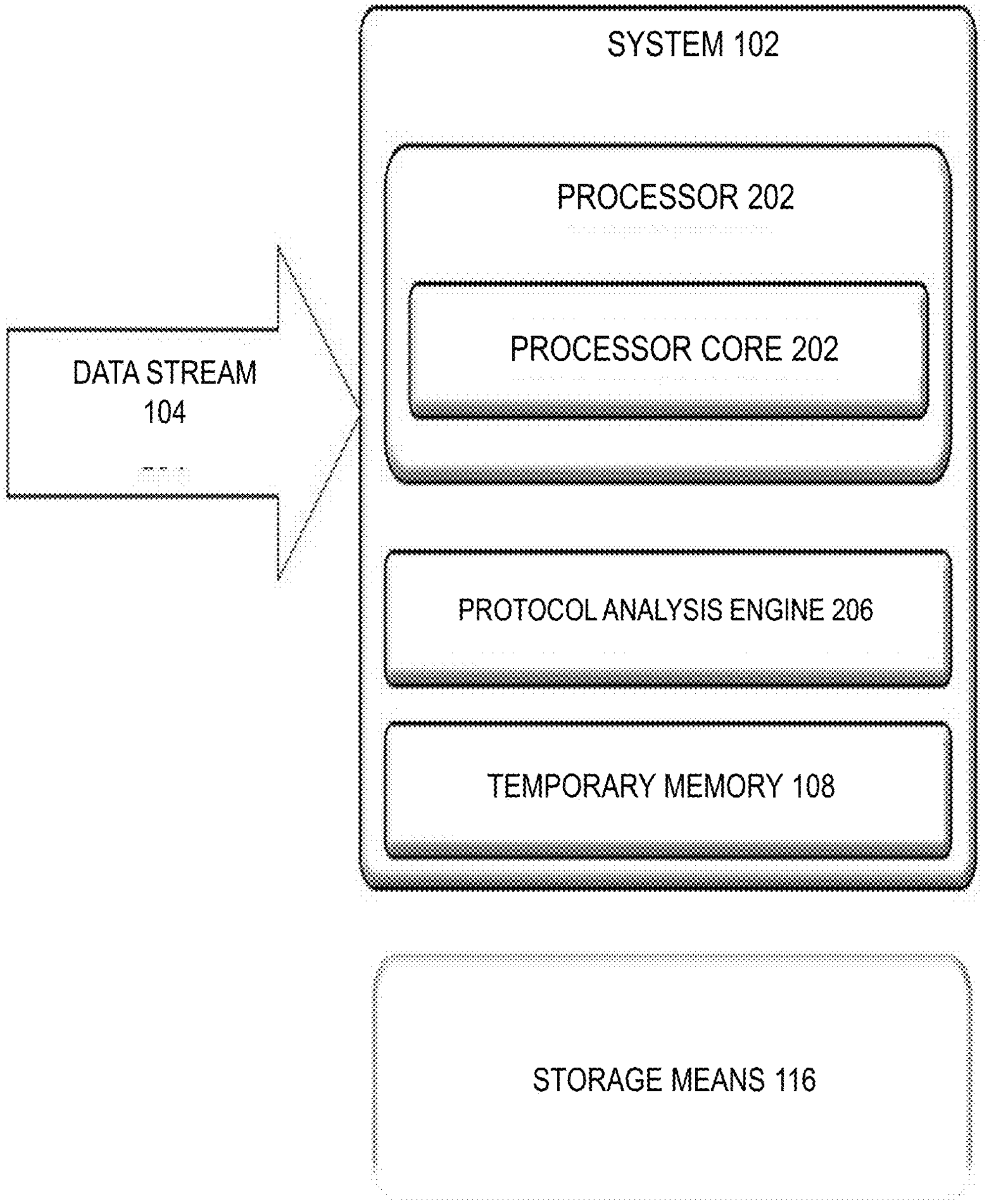
FIG. 2 illustrates the system diagram, according to an example of the present invention.
Figure 3:
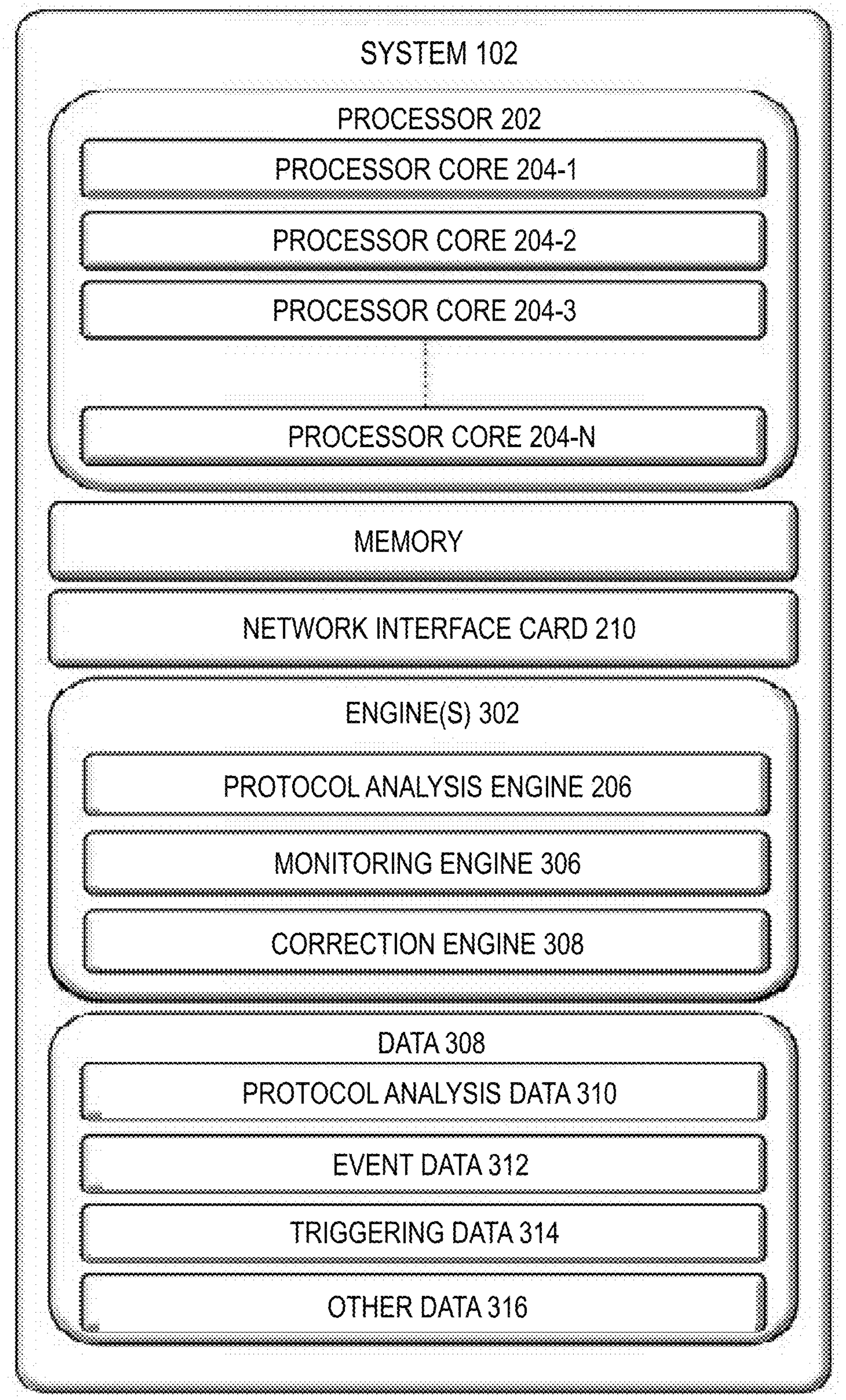
FIG. 3 shows another system diagram, according to an example of the present invention.
Figure 4:
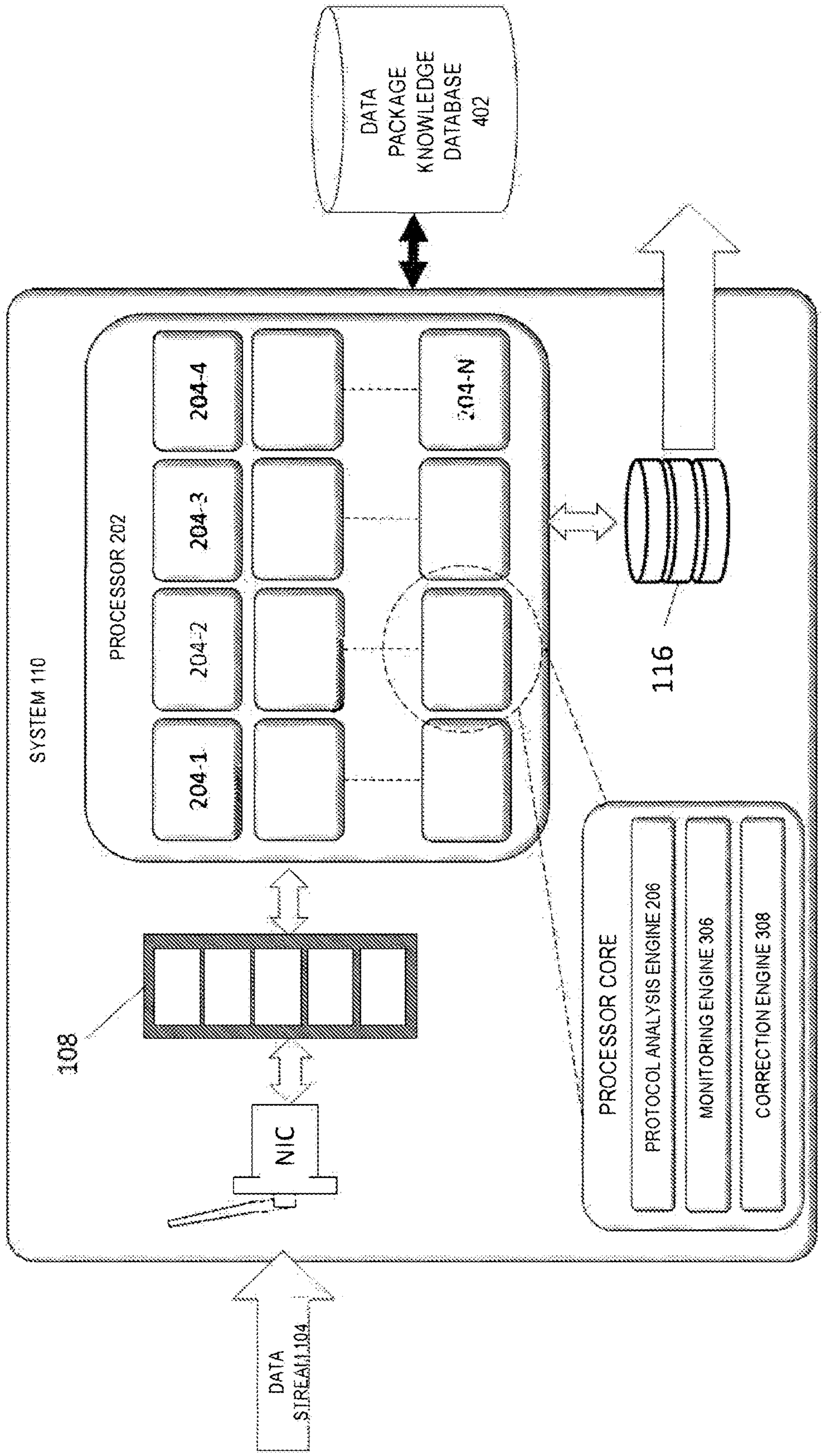
FIG. 4 illustrates implementation of the system according to the invention.
Figure 5:
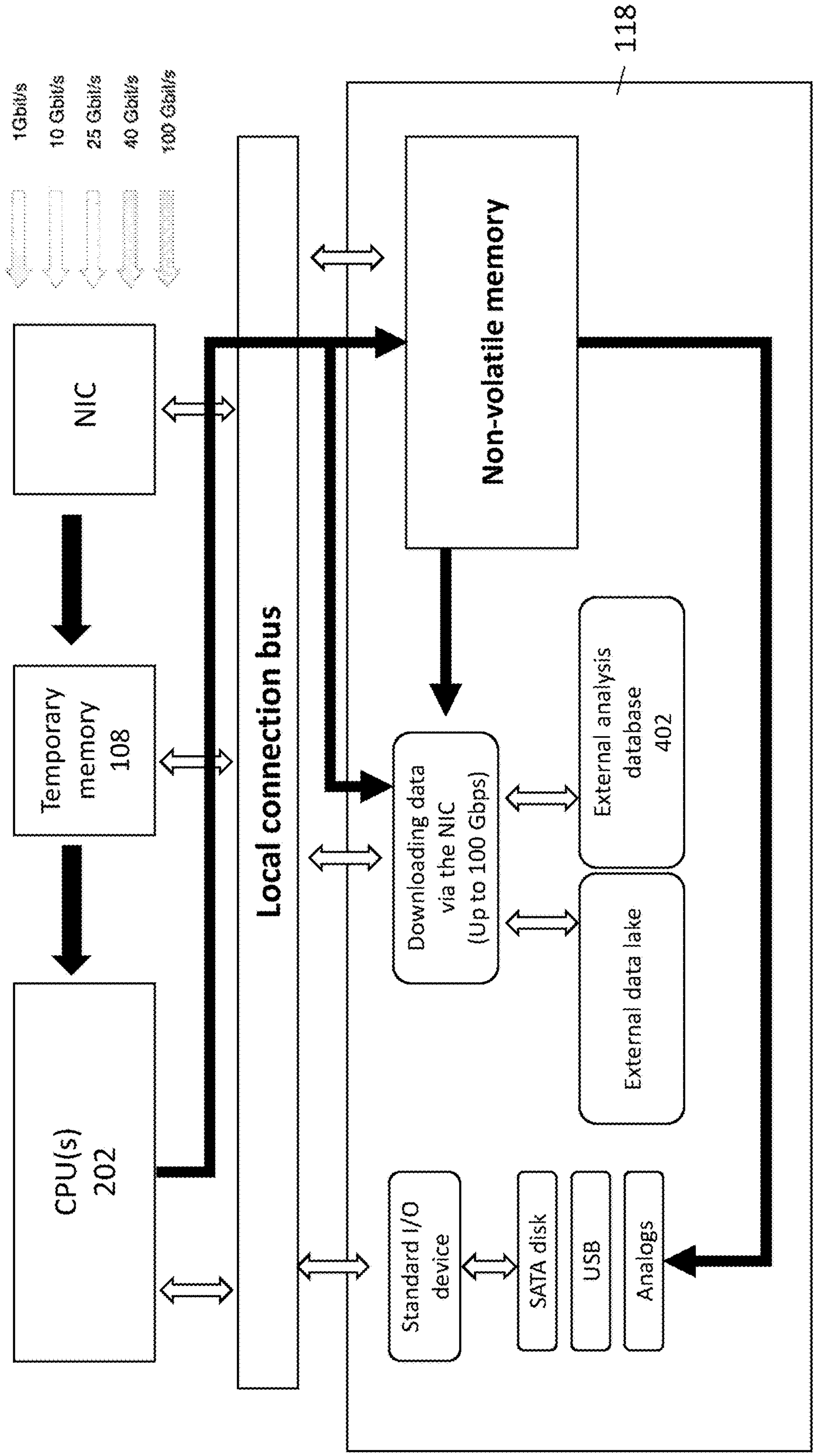
FIG. 5 illustrates a representation of the system according to the invention on the hardware side.
Figure 6:
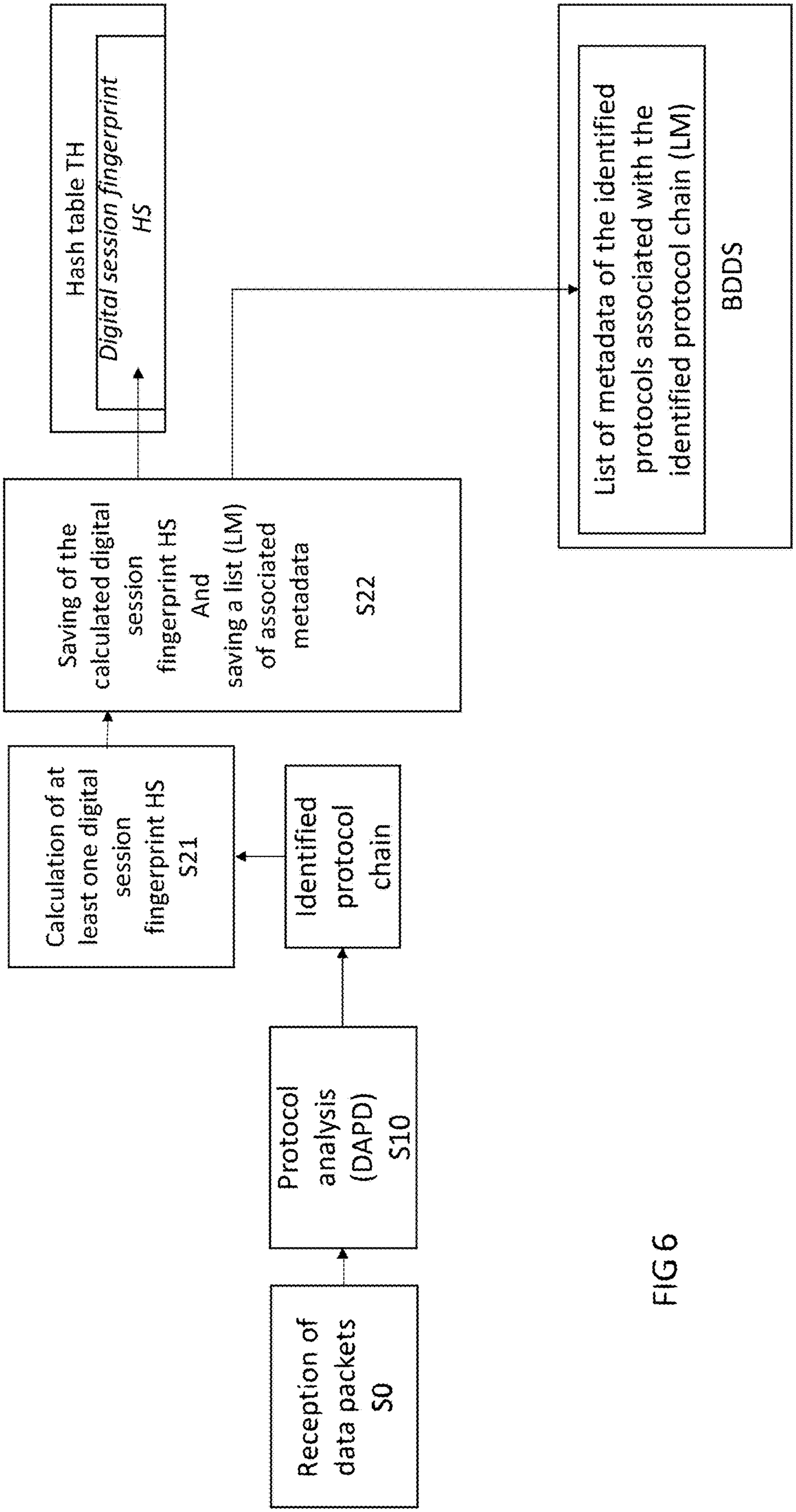
FIG. 6 illustrates a method of analysing data traffic according to the invention, FIG. 7 provides a detailed illustration of the method for monitoring and managing data traffic according to the invention.
Figure 7:
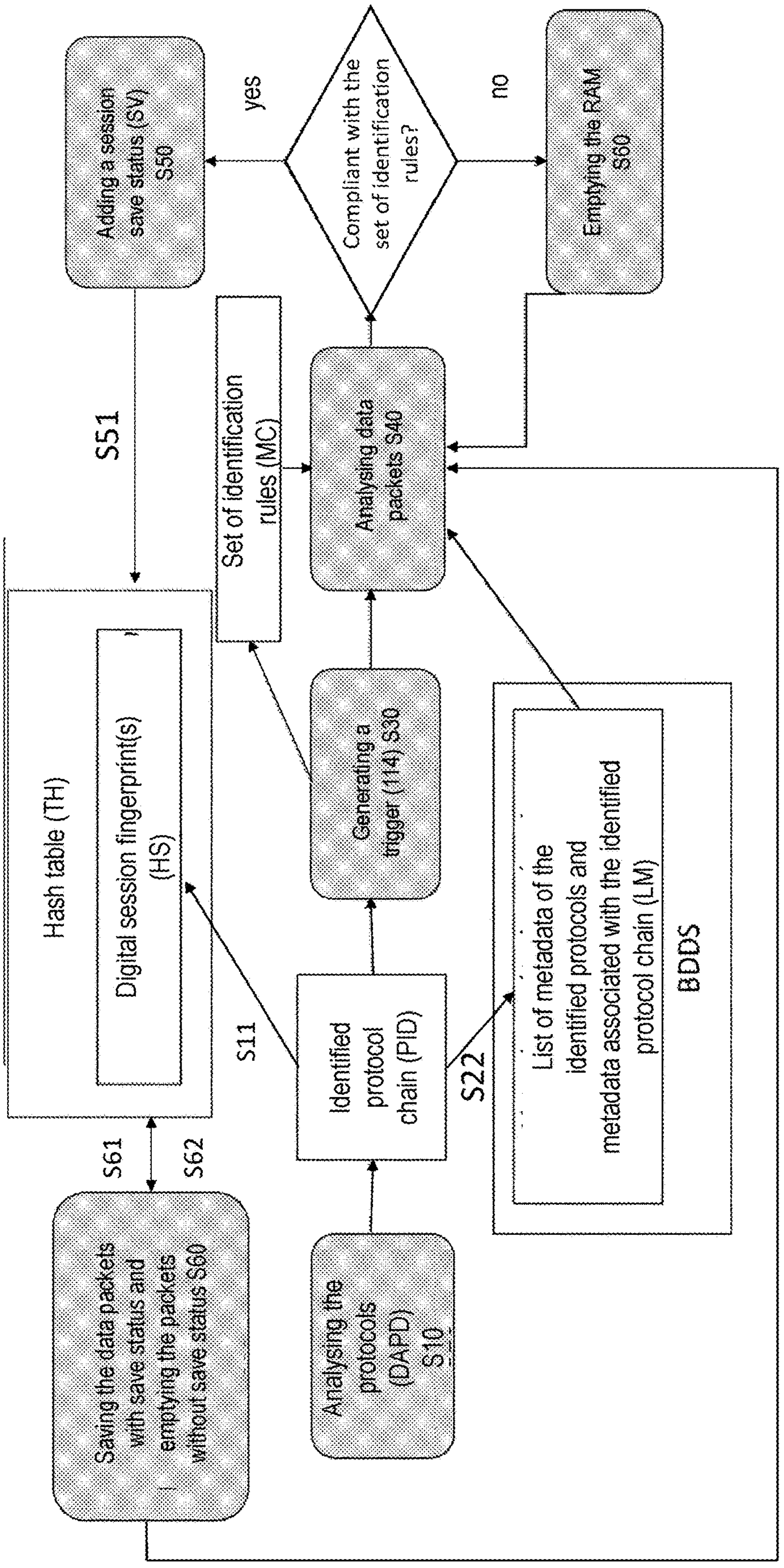
Figure 8:
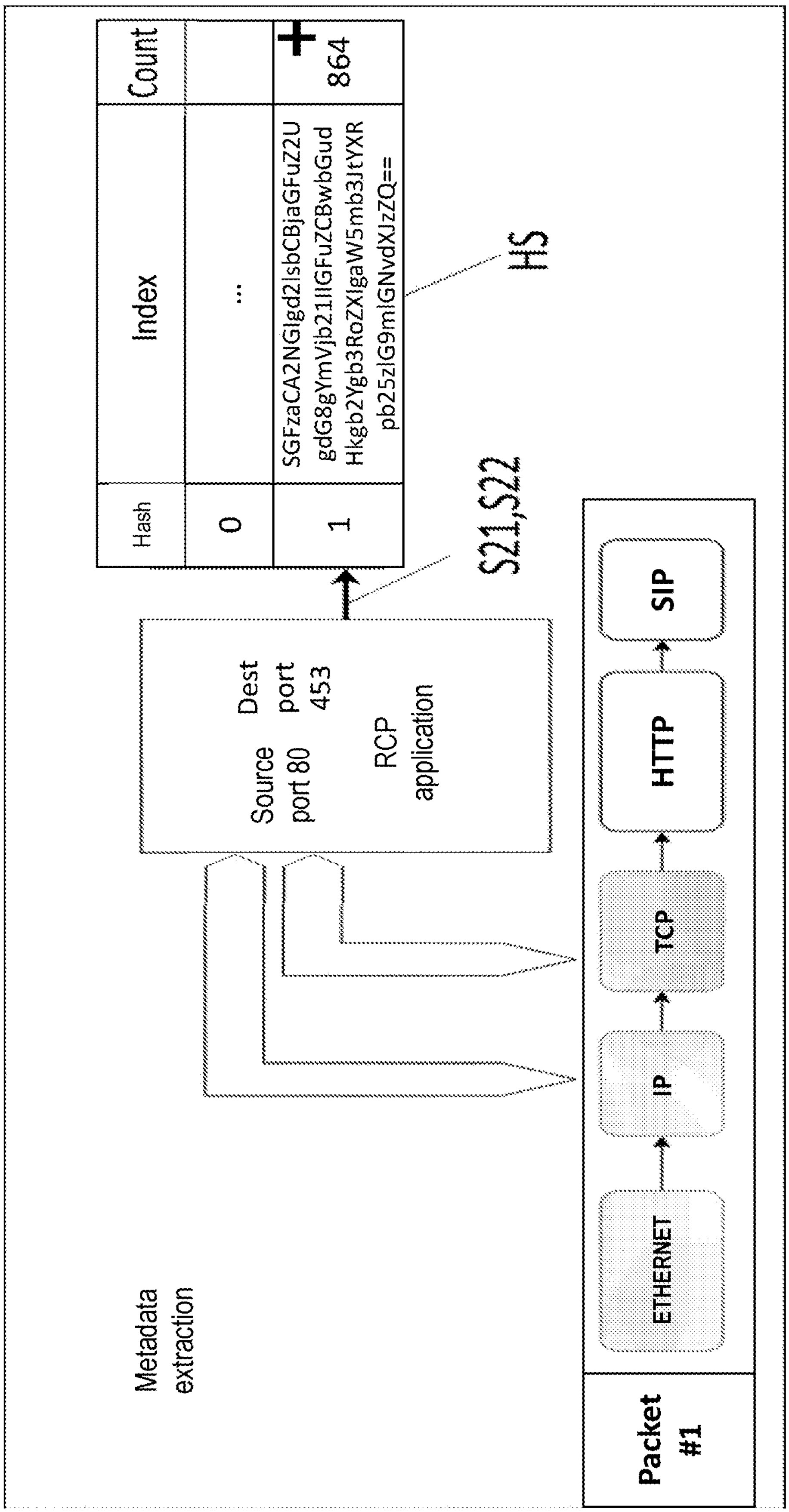
FIG. 8 illustrates the steps involved in managing digital fingerprints according to the invention.
Figure 9:
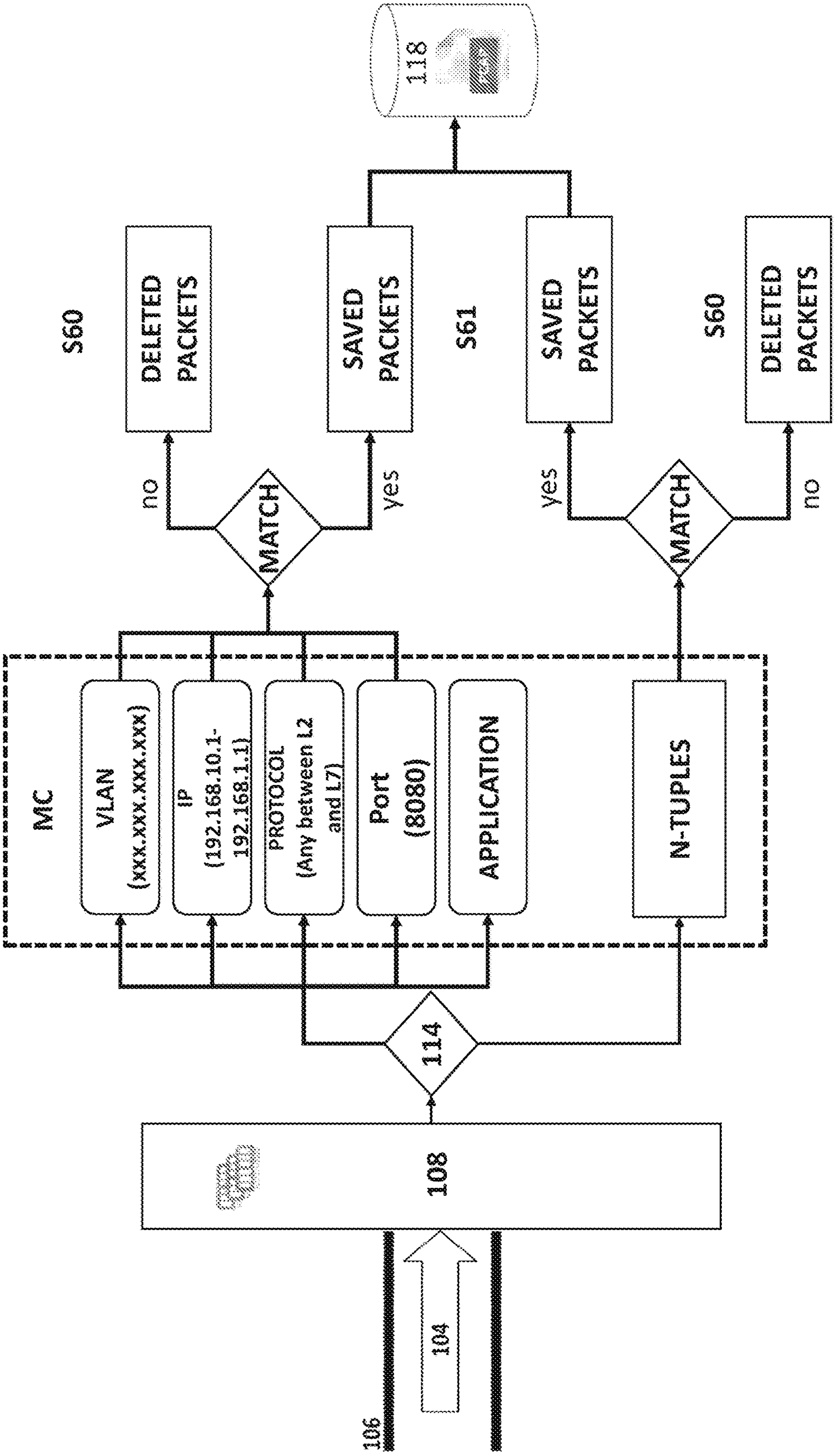
FIG. 9 illustrates a case of use of the method according to the invention.
Figure 10:
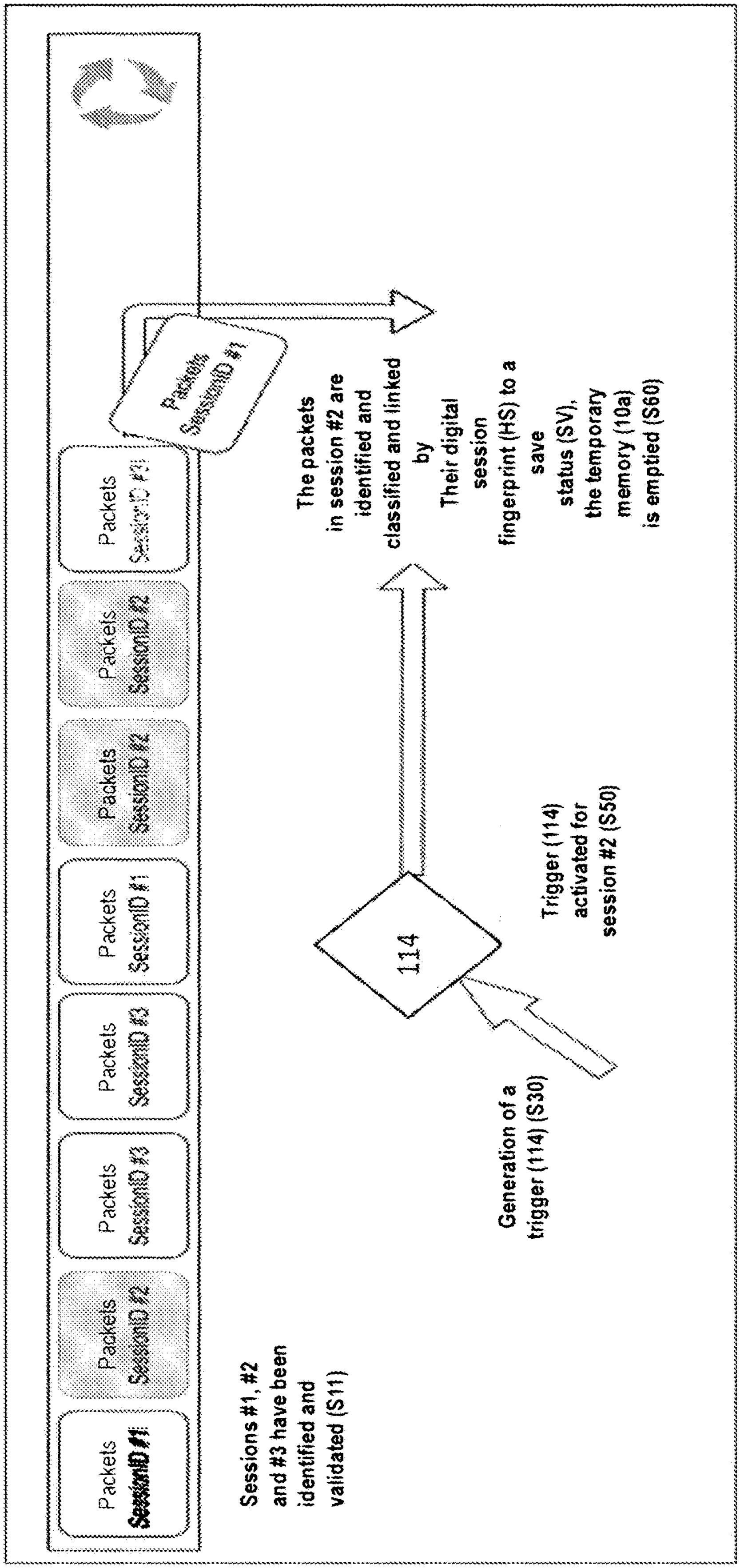
FIG. 10 schematically illustrates the emptying and storing step of the process according to the invention.
Figure 11:
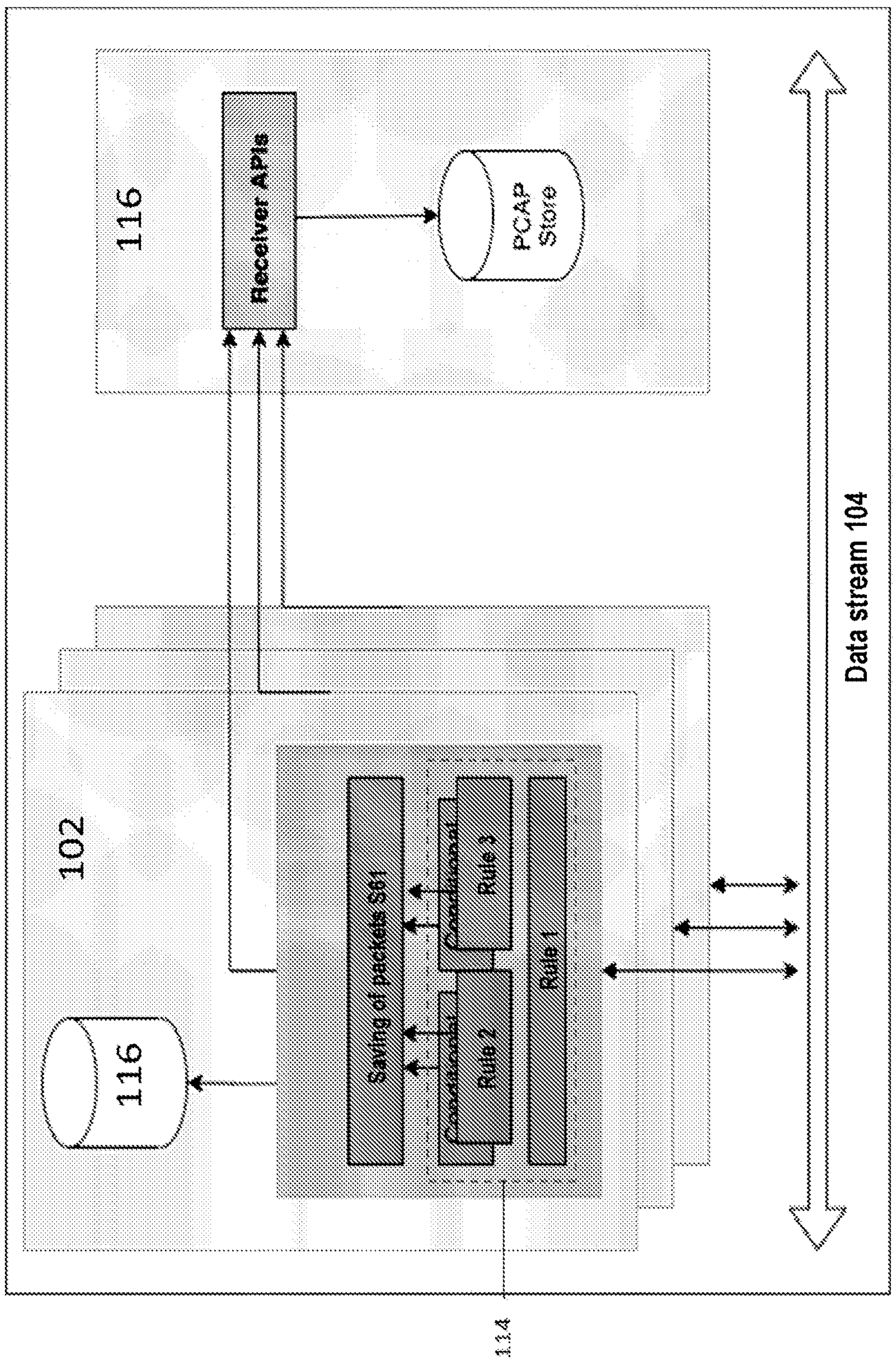
FIG. 11 shows a combined view of implementation of the method trigger in the system according to the invention.

Technological developments in communications networks have led to more and more IT devices being connected to each other, resulting in an increase in network traffic. To accommodate the ever-increasing capabilities of IT peripherals, network capabilities are also constantly being expanded. The improved speeds provided by networks have now exceeded network supervision and traffic management capabilities.

Known network supervision and traffic management equipment, such as network probes, are specialised hardware devices designed to monitor a data stream received via a communications network. With changes in network capabilities leading to an increase in data traffic and an increase in capabilities of IT peripherals, known network probes are not only failing to provide adequate services for monitoring data and managing traffic, but are also failing to provide other much-needed enhanced capabilities, such as data traffic visualisation, monitoring and maintenance of a minimum quality of service (QoS), and security against cyber threats.

Therefore, whenever network capabilities change, an increase in the influx of data traffic and/or any new measures for monitoring and supervising data traffic stream are identified, known network probes need to be redesigned to modify their processing capabilities in order to handle the increased influx of data traffic and enable the saving of network data of interest, also known as packet capture.

Known technologies include Transfer Control Protocol dump (Tcpdump), the most widely used technology today for capturing and saving network traffic.

However, Tcpdump technology fails to capture all the packets received when the data rate is too high, resulting in substantial loss of information. The recorded streams are corrupted by what might be termed "half-streams" or "semi-streams". These half-streams are streams that have begun to be received by the system before saving begins or that will end after saving has finished. Corruption can also occur if saving ends when the network stream is not yet finished.

Tcpdump technology also has the disadvantage of not being able to be used at bit rates in excess of 500 megabits per second (Mb/sec), and does not allow filtering of data packet saves based on more than five tuples (source Internet Protocol (IP) address/port number, destination IP address/port number and protocol used).

Field Programmable Gate Array (FGPA)-type technologies with very high-performance filters are also known, allowing filtering of data packet saves based on 5-tuples+ or 7-tuples.

An FPGA has the disadvantage of not being able to filter data packets accurately when the number and diversity of protocols to be classified is too complex (multiplexed protocols, complex protocol sequences, tunnelled protocols). FPGA based solutions will then tend not to classify protocols that do not announce themselves, increasing the inaccuracy of saving while causing a loss of visibility.

An FPGA cannot be used for relevant identification and classification of protocols beyond layer 4 of the OSI model. The application of an FPGA is therefore unsuitable for high layers and protocols that do not announce themselves, making it difficult to create certain complex filters using metadata associated with protocols at layers higher than 4, or protocols that do not announce themselves.

In addition, the lack of memory on FPGA cards will not allow the first packets of a session protocol chain to be recorded when saving is triggered late, resulting in corrupted streams.

Finally, the inability of FPGA technologies to perform deep packet analysis above layer 5 (application) also implies a truncated filtering capability not allowing application of saving filters to all low-level protocols (only the few that an FPGA is capable of implementing), and to protocols above layer 5.

In addition, in order to filter accurately the nature of the network packets to be recorded, the traffic must be analysed in real time using an analysis probe. However, probes can also be faced with performance issues that can potentially have a negative impact on the quality of the saves made.

The packets received can be discarded by many hardware or software components, as soon as an overconsumption of resources occurs. This may occur from the network card, which receives the packets and cannot broadcast them to the kernel, or later, somewhere in the kernel or in the detection software itself.

A network card can saturate its queue if it is unable to perform DMA (Direct Memory Access) writes as quickly as packets arrive from the network. Apart from possible hardware slowness on the communication buses themselves, the main cause of slowness is the filtering of memory accesses by the IOMMU (Input/Output (I/O) Memory Management Unit), which acts as a DMA write manager, capable of limiting the memory regions to which a server's peripherals are able to write, in the same way as a firewall limits access to a network. Its function is crucial for server security, but completely counter-productive if it results in the inability to fulfil its role as an analysis probe.

The software architecture of the analysis engines can also influence performance if the packets received are poorly distributed between the different processes responsible for their processing. Packet loss occurs when a processor or Central Processing Unit (CPU) is saturated/flooded by the processing that an analysis process is required to undertake. This situation arises very easily when the distribution of packets received is not random, but instead tends to concentrate all the packets relating to the same stream on the same analysis process (e.g. Transmission Control Protocol (TCP) sessions). This stream-based distribution is the most common and preferred, as it limits access to shared resources and increases the locality of memory accesses.

The disadvantage of this method is that it does not correctly distribute traffic including tunnels (Internet Protocol security (IPsec), Generic Route Encapsulation (GRE), Layer 2 Tunneling Protocol (L2TP), Transport Layer Security (TLS) . . . ).

This is because, unless the program in charge of distribution performs deep packet inspection (DPI) of the traffic, all the packets in a tunnel will be analysed by the same analysis process, and if the tunnel is highly active, the analysis process will easily be overwhelmed and packets will start to be lost.

The invention remedies these drawbacks and improves the situation.

The present invention relates to the processing of a data stream comprising batches of packets each defined by a chain of communication protocols associated with at least one session.

According to a general definition of the invention, the method comprises the following steps: —receiving a plurality of batches of data packets within a predefined period of time via a communication channel and storing said batches of packets in a temporary memory;

- performing, for each batch of data packets, a protocol analysis enabling the communication protocols in the protocol chain to be identified, and validating at least one session associated with the protocol chain when the identification of the protocol chain is complete;
- calculating at least one digital session fingerprint associated with an identified protocol chain, the session of which is validated during the validation step, and
- storing said calculated digital session fingerprint(s) in at least one hash table, and saving a list of the metadata associated with the identified protocols of the protocol chain of the validated session in a knowledge database;
- generating at least one trigger based on the protocol analysis results, wherein activation of the trigger is indicative of a match between at least one rule for identifying target metadata and the metadata associated with the identified protocols listed in the knowledge database;
- analysing the metadata associated with the identified protocols of the data packets of the validated session, stored in the temporary memory means, against the saved list of metadata associated with the identified protocols in the knowledge database, and checking whether the metadata associated with the identified protocols comply with the trigger's rule for identifying target metadata;
- if the data comply with the rule for identifying target metadata, activating the trigger and assigning a save status to at least one digital session fingerprint of the validated session; and
- emptying the temporary memory of each batch of data packets, the digital session fingerprint of which does not have a save status, and saving on a storage memory for subsequent processing all the data packets for which at least one associated digital session fingerprint has a save status.

The Applicant has observed that the process according to the invention makes it possible to respond to a very specific issue of triggering saving. Memory management using the method according to the invention enables packets belonging to the same session but the identification of which is delayed to be identified and saved, particularly for protocols requiring special identification packets.

Advantageously, the method according to the invention allows optimised management of the working memory and furthermore allows precise selection of the object of saving, as well as efficient targeting of sessions intricated in chains of tunnelled or multiplexed protocols and thus targeting and saving only the session of interest without spurious data that can be attributed to other transfers of the same data packet or packets.

Finally, the method according to the invention allows targeted sessions to be saved without loss of information or visibility, by departing from a 5-tuple type approach and adopting an n-tuple type approach, thus advantageously allowing sessions to be saved to be filtered based on any set of extracted metadata.

According to one embodiment, the trigger activation step comprises a sub-step of updating the hash table saved following the step of saving at least one digital session fingerprint, by assigning a save status to at least one digital session fingerprint.

In practice, the step of emptying the temporary memory comprises a sub-step of consulting the hash table to check whether at least one of the digital session fingerprints associated with the data packets subject to emptying has a save status.

In addition, the step of analysing the metadata associated with the identified protocols of the data packets of the validated session comprises a further sub-step of analysing the metadata associated with the attached content MP of the protocol chain of the validated session, implemented if at least one rule for identifying target metadata of the trigger comprises target metadata in relation to the attached content.

In practice, the trigger is capable of processing and applying a dynamic list of rules for identifying target metadata.

According to one embodiment of the invention, the target metadata of the trigger's identification rules belong to the group formed by native metadata and metadata calculated from selected mathematical formulae.

By way of a non-limiting example, the target metadata are representative of selected network parameters belonging to the group formed by destination IP, source IP, destination port, source port, protocol, IP address, port, QoS quality of service parameters, network tag, session volume, packet size, number of retries, version, encryption algorithm type and version, encryption type, CERT (Computer Emergency Response Team) certificate, SNI (Server Name Indication) value, packet size, returned IP, error flag, domain name, client version, server version, encryption algorithm version, compression algorithm, timestamp, IP version, hostname, lease-time, Uniform Resource Locator (URL), user agent, number of bytes of content attached, content type, status code, cookie header, client name, request service, error code value, request type, protocol value, response timestamp, privilege level, keyboard type and language, product identification, screen size, or any similar specific metadata extracted from the protocols in one or more data packets of the validated session, similar specific metadata extracted from the content attached to one or more data packets of the validated session.

In practice, the step of analysing the protocols and the step of analysing the metadata of the data packets of the validated session are performed on the data packets of layer 2 to layer 7 of the OSI model.

When all the data packets are processed, the updated data packets can be resubmitted to the protocol analysis engine. Repeating the protocol analysis can determine whether the processing of all the data packets has actually dealt with the occurrence of the event. If the event is resolved, the updated data packets can be released and made available to the intended recipient. However, if it is determined that another event has occurred during the analysis of the updated data packets, another trigger can be generated and the updated data packets can be subsequently processed to deal with the occurrence of the event.

As a result, storing the set of data packets for which an event has occurred, when the trigger is generated, facilitates efficient monitoring and visualisation of the data traffic in a network.

Furthermore, processing the set of data packets, such as replacing them with a set of corrected data packets or modifying the set of data packets, makes it possible to deal with the cause of the occurrence of the event. In this way, anomalies or malfunctions in data traffic can be identified and dealt with in good time. In addition, data packets can be analysed to preventively detect security risks and address related concerns.

The present invention also relates to the processing of a data stream comprising batches of packets each defined by a chain of communication protocols attached to at least one session.

According to another general definition of the invention, the system according to the invention comprises:

- network interface means configured to receive a data stream from a communication channel;
- a processor comprising at least one processing core for processing a predetermined number of data packets per minute ppm;
- a temporary memory, coupled to the processor, capable of storing a plurality of batches of data packets from the network interface means;
- a protocol analysis engine executable on at least one processing core, wherein the protocol analysis engine is capable of:
  - receiving a plurality of batches of data packets via a communication channel;
  - performing, for each batch of data packets, a protocol analysis enabling the communication protocols in the protocol chain to be identified, and validating at least one associated session;
  - calculating at least one digital session fingerprint associated with an identified protocol chain, the session of which is validated, and
  - storing the calculated digital session fingerprint in at least one hash table, and saving a list of the metadata associated with the identified protocols of the protocol chain of the validated session in a knowledge database;
- a monitoring engine executable on at least one processing core, wherein the monitoring engine is capable of:
  - generating at least one trigger based on the protocol analysis results, wherein activation of the trigger is indicative of a match between at least one rule for identifying target metadata and the list of metadata associated with the identified protocols of the protocol chain of the validated session;
  - analysing the metadata of the data packets of the validated session, stored in the temporary memory means, against the saved list of metadata associated with the identified protocols in the knowledge database, and checking whether the metadata associated with the identified protocols comply with the trigger's rule for identifying target metadata;
  - if the data comply with the rule for identifying target metadata, activating the trigger and assigning a save status to at least one digital session fingerprint of the validated session; and
  - emptying the temporary memory means for each batch of data packets, the digital session fingerprint(s) of which do not have a save status; and
- a storage memory coupled to the processor capable of saving, for subsequent processing, all the data packets, the associated digital session fingerprint of which has a save status.

According to one embodiment of the invention, the monitoring engine is configured to update the hash table saved following the step of saving at least one digital session fingerprint, by assigning a save status to at least one digital session fingerprint in case of activation of the trigger.

In addition, the monitoring engine according to the invention is configured to consult the hash table and check whether the digital session fingerprint(s) associated with the data packets, the session of which is validated, have a save status.

According to one particular embodiment of the invention, the monitoring engine is configured to analyse metadata associated with the attached content of the protocol chain of the validated session when analysing the metadata associated with the identified protocols of the data packets of the validated session, if at least one rule for identifying target metadata of the trigger comprises target metadata in relation to the attached content.

In practice, the temporary memory means are gradually emptied when the use of the associated Random Access Memory (RAM) is between 95% and 98%.

By way of a non-limiting example, the temporary memory means are emptied chronologically by deleting the oldest data packets at a chosen emptying rate.

The above techniques are described in greater detail with reference to FIGS. 1 to 11. It should be noted that the description and numbers merely illustrate the principles of this object and the examples described in this document and should not be interpreted as limited to this object. It is therefore understood that a variety of arrangements may be devised which, although not explicitly described or shown in this document and in the following statements outlining principles, aspects and implementations of this object, together with specific examples thereof, are intended to encompass equivalents thereof.

FIG. 1 illustrates a communication environment 100 implementing a data packet analysis system 102.

With reference to FIGS. 1 to 5, the system 102 according to the invention firstly comprises network interface means Network Interface Card (NIC) configured to receive a data stream from a communication channel 106.

In practice, the network interface means NIC are coupled to the processor 202 and to the temporary memory 108. The network interface card NIC may be an integrated component of the system 102 or a separate component externally coupled to the system 102.

In an exemplary embodiment of this object, the system 102 may be implemented by a network service provider offering network connectivity to one or more subscribers, such as government organisations, multinational corporations, companies, businesses and other institutions. The network service provider can act as a connection channel between the communication channel 106 and its subscribers' IT devices. It should be noted that besides the system 102, the network service provider may deploy various other equipment items, devices, network nodes interconnected by one or more wired or wireless network links to provide network connectivity to subscribers. Network nodes may typically include switches, routers, access points and data links capable of facilitating communication between various subscriber hosts (e.g. server computers, client computers, mobile devices, etc.) that can generate and consume data traffic.

In another example, the system 102 may be deployed by individual institutions/organisations, providing network connectivity and security to one or more of its users.

In addition, the system 102 can be deployed as a standalone hardware peripheral or can be deployed in known communications equipment, depending on deployment and use.

As described above, the system 102 can receive data packets 104 from a communication channel 106.

In practice, the communication channel 106 can be a wireless or wired network, or a combination thereof. The communications network can be a set of individual networks, interconnected with each other and functioning as a single large network.

Examples of such individual networks include, but are not limited to, the Global System for Mobile Communications (GSM) network, the Universal Mobile Telecommunications System (UMTS) network, the Long Term Evolution (LTE) network, the Personal Communications Services (PCS) network, the Time Division Multiple Access (TDMA) network, the Code Division Multiple Access (CDMA) network, the Next Generation Network (NGN), the Public Switched Telephone Network (PSTN) and the Integrated Services Digital Network (ISDN). According to the terminology, the communications network comprises various network entities, such as gateways, switches and routers; however, these details have been omitted for the sake of brevity of the description.

In an exemplary implementation, the network interface card NIC can separate the data stream within a predefined period into one or more processing queues and allocate each processing queue to at least one processing core 204-1, 204-2, 204-3, 204-*n*.

For example, the network interface card NIC can separate the data stream in multiple processing queues according to the segregation criterion, which may be predefined or based on user preference.

It should be noted that each of the multiple processing cores 204-1, 204-2, 204-3, . . . , 204-*n* may allow different instances of the multiple engines to be executed thereon. For example, separate instances of the protocol analysis engine 206, the monitoring engine 306 and the correction engine 308 may be executed in parallel on each of the multiple processing cores 204-1, 204-2, 204-3, . . . , 204-*n*.

However, for ease of understanding, implementation of the system according to the invention has been explained with respect to a single processing core 204-1 of the processor 202, hereinafter referred to as the processing core 204.

The system 102 according to the invention furthermore comprises at least one processor 202 having at least one processing core 204 for processing a predetermined number of data packets per minute ppm.

In practice, the processor 202 may include several processing cores 204-1, 204-2, 204-3, . . . , 204-*n*.

The functions of the functional block labelled as "processor(s)" can be provided through the use of dedicated hardware as well as hardware capable of executing instructions. When provided by a processor, functions may be provided by a single dedicated processor, by a single shared processor, or by a plurality of individual processors, some of which may be shared. Furthermore, use of the term "processor" should not be construed as referring exclusively to the hardware capable of executing instructions and may implicitly include, without limitation, the Digital Signal Processor (DSP) hardware, the network processor, the Application-Specific Integrated Circuit (ASIC), the Read Only Memory (ROM) for storing the instructions, the temporary memory 108 (RAM), and non-volatile storage. Other hardware, standard and/or customised, may also be included.

The system 102 furthermore comprises a temporary memory 108, coupled to the processor 202, capable of storing a plurality of batches of data packets 104 from the network interface means NIC.

According to one embodiment of the invention, the system 102 can monitor and manage the data packets 104. The system 102 can first store the data packets 104 from a predefined period in the temporary memory 108.

By way of a non-limiting example, the temporary memory 108 can be implemented on a local memory, an external memory or a combination thereof, using registers, primary memories, cache memories or secondary memories, and can be implemented on any computer-readable medium, including, for example, volatile memory (e.g. RAM) and/or non-volatile memory (e.g. Erasable Programmable Read Only Memory (EPROM), flash memory, etc.).

The temporary memory 108 can provide data packets 110 for protocol and data analysis. It would be appreciated if a data traffic stream received from the communication channel 106 within the predetermined time period, such as the data packets 104, could be separated into one or more different processing queues before being saved on the temporary memory 108. The segregation of the data packets 104 into one or more processing queues can be based on a segregation criterion, which can be predefined or based on user preferences.

The system 102 may furthermore include the engines 302, wherein the engines 302 may include a protocol analysis engine 206, a monitoring engine 306.

For example, the motors 302 can be implemented as a combination of hardware and firmware. In the examples described here, such combinations of hardware and firmware can be deployed in a number of different ways. For example, the engine firmware may consist of executable processor instructions stored on a nontransitory machine-readable storage medium and the engine hardware may include a processing resource (e.g. implemented as a single processor or a combination of several processors) to execute these instructions.

In the present examples, the machine-readable storage medium may store instructions which, when executed by the processing resource, implement the engine functionalities. In such examples, the system 102 may include the machine-readable storage medium storing the instructions and the processing resource for executing the instructions. In other examples of this object, the machine-readable storage medium may be situated at a different location, accessible however to the system 102 and the processor 202.

The system 102 also includes data 304, which serve, among other aspects, as a repository for storing data that can be retrieved, processed, received or generated by the protocol analysis engine 206, the monitoring engine 306 and the correction engine 308. The data 304 may include the protocol analysis data 310, the event data 312, the trigger data 314 and other data 316. In one example, the data 304 can be stored in the memory 108.

The protocol (or communication session) analysis engine 206 and data analysis engine (hereinafter referred to as the analysis engine 206) of the system according to the invention is capable of being executed on at least one processing core 204, and is configured to allow the reception SO of a plurality of batches of data packets 104 within a predefined time period via a communication channel 106.

In practice, the data packets 104 provided for the protocol chain analysis engine 206 may correspond to a processing queue of the temporary memory 108 and the data packets in other processing queues (not illustrated) may be separately accessible from the temporary memory 108 for the protocol chain analysis engine 112.

The protocol analysis engine 206 is furthermore capable of implementing a protocol and data analysis of the data packets 104, and is configured to perform S10, for each batch of data packets 104, a protocol analysis DAPD making it possible to identify the communication protocols in the protocol chain, and to validate at least one associated session.

The analysis DAPD of the data packets 104 can allow determination of the communication protocol(s) of the data packets, in addition to analysis and extraction of metadata from the analysed data packets. The protocol analysis engine 206 can perform an analysis DAPD of the data packets 104 in a number of ways.

In one example, the protocol analysis engine 206 can perform an explicit classification analysis to check whether an identified protocol does not announce the following protocol(s).

The protocol analysis engine (206) can also perform detection by session classification, making it possible to check whether a conclusion can be drawn about the nature of the protocol being analysed from the sequence of protocols already identified.

Finally, the protocol analysis engine 206 can also perform Deep Packet Inspection (DPI) detection on the data packets. In this example, the protocol analysis engine 206 can perform DPI on layers 2 to 7 of the OSI (Open Systems Interconnection) model.

Subsequently, the protocol analysis engine 206 can perform data packet analysis and extraction for the data packets based on the identified communication protocols.

In addition, the protocol analysis engine 206 is configured to calculate S21 at least one digital session fingerprint HS associated with an identified protocol chain PID, the session of which is validated, according to a chosen hash function.

In practice, the protocol analysis engine 206 is configured to store S22 the calculated digital session fingerprint HS in at least one hash table TH, and generate and save a list LM of the metadata MPID associated with the identified protocols PID of the protocol chain of the validated session in a knowledge database BDDS.

The system 102 according to the invention furthermore comprises the monitoring engine 306 executable on at least one processing core 204, which engine is capable of generating S30 at least one trigger 114 based on the results of protocol analysis DAPD, wherein the activation of the trigger 114 is indicative of the match between at least one rule for identifying target metadata MC, and the list LM of the metadata MPID associated with the identified protocols PID of the protocol chain of the validated session.

In practice, the trigger 114 thus generated is capable of processing and applying a dynamic list of rules for identifying target metadata MC.

The target metadata MC of the trigger's 114 identification rules belong to the group formed by native metadata and metadata calculated from selected mathematical formulae.

By way of a non-limiting example, the target metadata (MC) are representative of selected network parameters belonging to the group formed by destination IP, source IP, destination port, source port, protocol, IP address, port, QoS quality of service parameters, network tag, session volume, packet size, number of retries, version, encryption algorithm type and version, encryption type, CERT (Computer Emergency Response Team) certificate, SNI (Server Name Indication) value, packet size, returned IP, error flag, domain name, client version, server version, encryption algorithm version, compression algorithm, timestamp, IP version, hostname, lease-time, URL, user agent, number of bytes of content attached, content type, status code, cookie header, client name, request service, error code value, request type, protocol value, response timestamp, privilege level, keyboard type and language, product identification, screen size, or any similar specific metadata extracted from the protocols in one or more data packets of the validated session, similar specific metadata extracted from the content attached to one or more data packets of the validated session.

According to one embodiment of the invention, the occurrence of an event, such as a deterioration in QoS, a change in the configuration of the IT peripherals, a change in the network capabilities, a security risk or the like can influence the nature of the rules applied for identifying the target metadata MC.

In one example, the event data 312 can store a set of parameters that can be used as a reference for identifying the occurrence of an event during the analysis S10 of the protocol chains of the set of data packets and thus participate in updating the rules applied for identifying the target metadata MC.

In addition to identifying the occurrence of events, the set of parameters can also indicate a user-defined criterion for filtering data packets. For example, a network administrator may be aware that data packets received from a particular IP address may pose a security risk. In such a situation, the set of parameters stored in the event data 312 can be updated to identify and filter the set of data packets received from the particular IP address. Similarly, the set of parameters can include a list of predetermined protocols, sessions and other factors that can increase network vulnerability.

The monitoring engine 306 according to the invention is furthermore configured to analyse S40 the metadata of the data packets of the validated session, stored in the temporary memory means 108, against the saved list LM of metadata MPID associated with the identified protocols PID in the knowledge database BDDS, and to check whether the metadata MPID associated with the identified protocols PID comply with the trigger's 114 rule for identifying target metadata MC.

The read list LM is based on n-tuple metadata extraction.

Advantageously, this n-tuple approach makes it possible to extract associated metadata MPID specific to the identified protocol PID, thereby overcoming the constraints involved in the 5-tuple approach and the restricted visibility associated with it.

The following metadata are extracted from the following identified protocols PID, by way of non-limiting examples:

Table of examples of extractable metadata for a list of selected protocols.

| PROTOCOLS | EXAMPLES OF EXTRACTED METADATA |
|---|---|
| Virtual Local Area Network (VLAN) Virtual eXtensible Local Area Network (VxLAN) | Network tag |
| Multi-Protocol Label Switching (MPLS) | Identification (Id) |
| TCP | Session volume, packet size, number of retries |
| TLS | version, type and version of the encryption algorithm, CERT of the certificate, SNI value |
| Domain Name System (DNS) | Packet size, returned IP, error flag, domain name, rcode |
| Secure Shell (SSH) | Client version, server version, encryption algorithm version, compression algorithm version |
| Dynamic Host Configuration Protocol (DHCP) | Timestamp, IP version, server IP addresses, endpoint IP address, originating port/protocol - TCP or UDP - server or endpoint hostname, lease-time, . . . |
| HyperText Transfer Protocol (HTTP) | Url, user agent, number of payload bytes, content type, status code, cookie header, etc. |
| Kerberos | client name, service requested, error code value, request type, protocol value, response timestamp, privilege level, encryption type, . . . |
| Lightweight Directory Access Protocol (LDAP) | session duration, number of logon errors, end-of-session flag, query result code, error code, etc. |
| Remote Desktop Protocol (RDP) | cookie username, keyboard type and language, client version, product ID, screen size, . . . |

In other words, the saved list LM of metadata MPID associated with the identified protocols PID serves as a reading grid for said monitoring engine 306 in order to advantageously save resources.

In the event of compliance with the rule(s) for identifying target metadata MC, the trigger 114 is activated S50 and the monitoring engine 306 then assigns a save status SV to at least one digital session fingerprint HS of the validated session stored on the hash table TH.

The assignment of a save status SV by the monitoring engine 306 comprises the updating S51 of the hash table TH saved following the step of storing S22 by the analysis engine 206 of at least one digital session fingerprint HS, by assigning a save status SV to at least one of the digital session fingerprints HS of the validated session and storing this status on the hash table TH.

According to one particular embodiment of the invention, the monitoring engine 306 is configured to analyse metadata associated with the attached content MP of the protocol chain of the validated session during the analysis S40 of the metadata MPID associated with the identified protocols PID of the data packets of the validated session.

Such an analysis is implemented if at least one rule for identifying target metadata MC of the trigger 114 includes target metadata MC related to an attached content.

The monitoring engine 306 according to the invention is furthermore configured to implement emptying S60 of the temporary memory means 108 for each batch of data packets, the digital session fingerprint(s) HS of which do not have a save status SV.

According to one embodiment of the invention, the temporary memory means 108 are gradually emptied when the use of the associated RAM is between 95% and 98%.

According to one particular embodiment of the invention, the temporary memory means 108 are emptied chronologically by deleting the oldest data packets at a chosen emptying rate.

In practice, the monitoring engine 306 is configured to consult S61 the hash table TH and check whether the digital session fingerprint(s) HS associated with the data packets TH, the session of which is validated, have a save status SV.

The monitoring engine 306 according to the invention is furthermore configured to implement saving S61 on a storage memory 116, of all the data packets for which at least one associated digital session fingerprint HS has a save status SV.

According to a first particular embodiment of the invention, based on the generation S30 of the trigger 114, the monitoring engine 306 can generate a notification indicating the severity of the event. The monitoring engine 306 can also include in the notification a set of actions that can be carried out in order to mitigate the event.

According to a second particular embodiment of the invention, based on the generation S30 of the trigger 114 for the set of data packets, the system according to the invention may comprise a correction engine 308.

Said correction engine 308 is capable of performing an additional processing operation on the set of data packets. For instance, in one example, the correction engine 308 can replace the set of data packets with a set of corrected data packets. In another example, the correction engine 308 can modify all the data packets.

Once the correction engine 308 has processed all the data packets, the protocol analysis engine 206 can resubmit the data packets for an analysis DAPD. Repeating the analysis can determine whether the processing of the set of data packets has actually dealt with or mitigated the occurrence of the event. The way in which the analysis DAPD can be performed on the data packets is described above and has not been reproduced for the sake of brevity. If the protocol analysis engine 206 determines that the event has been resolved, the protocol analysis engine 206 may release the updated data packets for consumption by a destination IT peripheral.

However, if the protocol analysis engine 206 determines that another event has occurred during the DAPD of the updated data packets, the protocol analysis engine 206 may generate another trigger. In such a situation, the protocol analysis engine 206 can reprocess another set of data packets that may have caused the other event. In one example, reprocessing may include replacing the set of data packets with a set of corrected data packets or modifying the set of data packets.

In this way, anomalies or malfunctions in data traffic can be identified and dealt with in good time. In addition, data packets can be analysed to preventively detect security risks and address related concerns.

The system 102 according to the invention furthermore comprises a storage memory 116 coupled to the processor 202 capable of saving 508 for subsequent processing, all the data packets, the associated digital session fingerprint HS of which has a save status SV, the trigger 114 thus forming a saving filter.

For instance, the storage memory 116 may consist of local, or remote, storage means, such as the Cloud.

Furthermore, the system 102 can be coupled to a data packet knowledge database BDDS, wherein the data packet knowledge database BDDS corresponds to the knowledge base BDC for protocol detection and the dynamic session database BDDS for session detection.

In an exemplary implementation of the system according to the invention, the network interface card NIC can receive a data stream of data packets 104 via a communications network. The network interface card NIC can subsequently separate the data stream of data packets 104 into multiple processing queues, wherein each of the multiple processing queues is to be processed by a separate processing core of the processor 202. The network interface card NIC can subsequently transfer the multiple processing queues to the temporary memory 108 and can simultaneously inform the processor 202 of the address at which each of the multiple processing queues is stored on the temporary memory 108.

In an exemplary implementation, one of the instances of the protocol analysis engine 206 running on one of the processing cores, for example the processing core 204-1, can perform a DAPD on the data packets included in the corresponding processing queue. In one example, the protocol analysis engine 206 can analyse a first set of data packets in the processing queue to determine the characteristics of the first set of data packets. The protocol analysis engine 206 can subsequently perform the DAPD for a first data packet following the first set of data packets to predict a communication protocol for the data packet. The protocol analysis engine 206 can perform the DAPD on the first data packet based on a dynamic decision-making tree correlated to the data packet knowledge database BDDS. The protocol analysis engine 206 can subsequently analyse and extract the first data packet according to the data label associated with it.

In one example, the protocol analysis engine 206 can perform DAPD and data analysis and extraction in parallel for the data packets included in the processing queue. For example, once the protocol analysis engine 206 has predicted the communication protocol for the first data packet, the first data packet can be transferred for data analysis and extraction. While the protocol analysis engine 206 is analysing and extracting data on the first data packet, the protocol analysis engine 206 can simultaneously begin performing DAPD for a second data packet following the first data packet in the data stream.

The simultaneous execution of DAPD and data analysis and extraction for data packets on a single processor core facilitates scalability to handle any alterations to the influx of data received via the communications network. In one example, the techniques described above can facilitate the processing of data streams with data traffic in excess of 100 Gbps.

With reference to FIGS. 6 to 11, the invention also relates to a method of processing of a data stream comprising batches of packets 104 each defined by a chain of communication protocols associated with at least one session.

The method according to the invention comprises a first step of receiving SO a plurality of batches of data packets 104 within a predetermined time via a communication channel 106, and storing said batches of packets 104 in a temporary memory 108.

For instance, the plurality of batches of data packets 104 may be received by a network interface card NIC of the system 102.

The method also includes a step S10 of protocol analysis DAPD making it possible to identify the communication protocols in the protocol chain, and for extracting metadata from the plurality of data packets analysed.

The step S10 of protocol analysis DAPD consists of a succession of conditional classification methods, including explicit classification detection, configured to check whether a given protocol announces the next protocol in the protocol chain.

The protocol analysis DAPD furthermore comprises a so-called session detection configured to identify the next protocol(s) using the previously identified protocol chains.

Finally, the protocol analysis DAPD comprises deep packet inspection detection, which involves identifying the communication protocol of the next packet according to a dynamic decision-making tree correlated to a knowledge database BDC comprising protocol analysis parameters and a database of specific markers, also called labels, specific to each known protocol.

If the next protocol is not identified, the protocol analysis DAPD is configured to issue a list of potential candidate protocols to be taken into account according to at least two possible detection branches, each detection being attached to a sub-session determined to analyse the next protocol or protocols by repeating the analyses according to the classification by explicit detection, by session detection, and by deep packet inspection until at least one protocol, the identity of which is certain is identified.

In practice, the step S10 of protocol analysis DAPD comprises a sub-step of validating S11 at least one session associated with the protocol chain when the entire protocol chain has been identified and classified.

A session means a communication session representative of a sequence of protocols.

Validation S11 of a session means complete identification of the associated protocol chain.

The method according to the invention furthermore includes a step of calculating S21 at least one digital session fingerprint HS associated with an identified protocol chain PID, the session of which is validated during the validation step S11.

In practice, calculation S21 of the digital session fingerprint HS is performed after each protocol analysed in the protocol chain according to a chosen hash function.

Calculation S21 of the digital fingerprint HS is based on the extraction of metadata from each protocol identified during the analysis step S10, and the hashing of a dynamically defined list specific to each type of protocol, adopting an n-tuple approach. Each protocol will therefore have a defined number of parameters used to calculate digital session fingerprint HS, so that once the session has been validated, a completely unique session identifier can be obtained.

The step of calculation S21 is followed by a step S22 of storing said calculated digital session fingerprint(s) HS in at least one hash table TH, as well as saving a list LM of the metadata MPID associated with the identified protocols PID of the protocol chain of the validated session in a knowledge database BDDS.

Advantageously, the list LM of metadata MPID associated with the identified protocols PID in the protocol chain of the validated session makes it possible to identify the metadata on which any subsequent analysis can be based and thus save resources by concentrating only on information that is available with certainty.

The method according to the invention also comprises a step of generating S30 at least one trigger 114 based on the results of protocol analysis DAPD.

Said trigger 114 comprises a series of commands executed by activation according to selected conditions, wherein activation is indicative of a match between at least one rule for identifying target metadata MC and the metadata MPID associated with the identified protocols PID, the list LM of which is saved in the knowledge database BDDS.

According to one embodiment of the invention, the trigger 114 is capable of processing and applying a dynamic list of rules for identifying target metadata MC.

Target metadata MC are any metadata, native or calculated from selected mathematical formulae, capable of enabling precise selection of part of a data stream 104.

By way of a non-limiting example, the target metadata (MC) are representative of selected network parameters belonging to the group formed by destination IP, source IP, destination port, source port, protocol, IP address, port, QoS quality of service parameters, network tag, session volume, packet size, number of retries, version, encryption algorithm type and version, encryption type, CERT (Computer Emergency Response Team) certificate, SNI (Server Name Indication) value, packet size, returned IP, error flag, domain name, client version, server version, encryption algorithm version, compression algorithm, timestamp, IP version, hostname, lease-time, URL, user agent, number of bytes of content attached, content type, status code, cookie header, client name, request service, error code value, request type, protocol value, response timestamp, privilege level, keyboard type and language, product identification, screen size, or any similar specific metadata extracted from the protocols in one or more data packets of the validated session, similar specific metadata extracted from the content attached to one or more data packets of the validated session.

According to one particular embodiment of the invention, the target metadata MC may comprise metadata associated with the attached content MP of the protocol chain of the validated session.

According to one embodiment of the invention, the trigger 114 can be generated following the occurrence of an event during the step S10 of protocol analysis DAPD.

Furthermore, an event may include: a deterioration in the quality of service, a change in the configuration of the IT peripherals, a change in the network capabilities or a security risk, for which a trigger will be generated specifically according to the parameters of the event encountered.

The method according to the invention furthermore comprises a step of analysis S40 of the metadata MPID associated with the identified protocols PID of the data packets of the validated session, stored in the temporary memory means 108 as a function of the saved list LM of metadata MPID associated with the identified protocols PID in the knowledge database BDDS.

In other words, the saved list LM of metadata MPID associated with the identified protocols PID serves as a reading grid during analysis S40 of the metadata MPID associated with the identified protocols PID.

In practice, the step of analysis S40 of the metadata MPID associated with the identified protocols PID furthermore includes checking the presence or absence of a match between the metadata MPID associated with the identified protocols PID and at least one rule for identifying target metadata MC of the trigger 114.

If the data comply with the rule for identifying target metadata MC, the method according to the invention comprises a step of activation S50 of the trigger 114, allowing assignment of a save status SV to at least one saved digital session fingerprint HS of the validated session.

In practice, the step of activation S50 of the trigger 114 comprises a substep of updating S51 the hash table TH saved following the step of saving S22 at least one digital session fingerprint HS, by assigning a save status SV to at least one digital session fingerprint HS, the target metadata MC of which match the analysed metadata.

According to one embodiment of the invention, the step of analysis S40 the metadata associated with the identified protocols PID of the data packets of the validated session comprises a further sub-step of analysing the metadata associated with the attached content MP of the protocol chain of the validated session, implemented if at least one rule for identifying target metadata MC of the trigger 114 comprises target metadata MC in relation to the attached content MP.

The method according to the invention furthermore comprises a step of emptying the temporary memory 108.

The step of emptying S60 is conditional, and configured to empty S60 the temporary memory 108 of each stored batch of packets of data, the digital session fingerprint HS of which does not have a save status SV.

At the same time, the process furthermore comprises a sub-step of storing S61 all the data packets for which at least one associated digital session fingerprint HS has a save status SV.

Such a selective storing step S61 also enables the specific saving of the session of interest, the target metadata MC or associated rules of the trigger 114 of which have been recognised, and indeed with no constraint as to the diversity and the layer on which the protocols of the validated session are located.

In practice, the storing step S61 is carried out to a storage memory 116 for subsequent processing of the filtered data packets.

By way of a non-limiting example, the data packets saved in the storage memory 116 are converted to PCAP format.

According to one embodiment of the invention, the steps of emptying S60 the temporary memory 108 and storing S61 comprise a prior sub-step of consulting S61 the hash table TH to check whether at least one of the digital session fingerprints HS associated with the data packets subject to emptying S60 has a save status SV.

In practice, the step S10 of protocol analysis DAPD and the step of analysing S40 the metadata of the data packets of the validated session MPID are carried out on the data packets of layer 2 to layer 7 of the OSI model.

According to a particular embodiment of the invention, the set of data packets saved following the storing step S61 can be replaced by a corrected set of data packets in the plurality of data packets. In one example, the set of data packets can be replaced by the set of data packets corrected by a correction engine 308 of the system 102.

For instance, the corrected set of data packets is analysed once again using the method according to the invention, in order to determine whether the replacement of the set of data packets by the corrected set of data packets has effectively resolved the occurrence of the event.

It can be understood that steps S10 to S60 can be carried out in the system 102. The blocks of methods SO, S10, S11, S21, S22, S30, S40, S50, S51, S60, S61 and S62 can be executed based on instructions stored in a non-transient computer readable medium, as will be readily understood. The non-transient computer-readable medium may include, for example, digital memories, magnetic storage media, such as magnetic disks and tapes, hard disks or optically readable digital data storage media.

Advantageously, such a process makes it possible to use all the metadata from all the protocols to generate triggers 114, the identification rules of which form saving filters, making said filters versatile and the architecture for applying the filters adaptable to any needs, and also making it possible to save traffic very accurately.

Although examples of the present invention have been described in language specific to the methods and/or structural features, it should be understood that the present invention is not limited to the specific methods or features described. Instead, the specific methods and features are disclosed and explained by way of examples of the present invention.

What is claimed is:

1. A method of processing of a data stream comprising batches of packets, each batch of packets defined by a protocol chain of communication protocols associated with at least one session, comprising:

receiving a plurality of batches of data packets via a communication channel and storing said plurality of batches of data packets in a temporary memory;

performing, for each batch of data packets of the plurality of batches of data packets, a protocol analysis (DAPD) enabling the communication protocols in the protocol chain to be identified, and validating the at least one session associated with the protocol chain based on the identification of the protocol chain being complete;

determining at least one digital session fingerprint (HS) associated with the identified protocol chain (PID) of the at least one session validated during the validating, storing said determined at least one digital session fingerprint(s) (HS) in at least one hash table (TH), and saving a list (LM) of metadata (MPID) associated with the identified communication protocols (PID) of the protocol chain of the at least one validated session in a knowledge database (BDDS);

generating at least one trigger based on results of the protocol analysis (DAPD), wherein activation of the at least one trigger is indicative of a match between at least one rule for identifying target metadata (MC) and the metadata (MPID) associated with the identified communication protocols (PID), the list (LM) is saved in the knowledge database (BDDS);

analyzing the metadata (MPID) associated with the identified communication protocols (PID) of a particular batch of data packets of the at least one validated session, stored in the temporary memory, against the saved list (LM) of metadata (MPID) associated with the identified communication protocols (PID) in the knowledge database (BDDS), and checking whether the metadata (MPID) associated with the identified communication protocols (PID) comply with the at least one trigger's rule for identifying the target metadata (MC);

determining the metadata comply with the at least one trigger's rule for identifying the target metadata (MC);

activating the at least one trigger and assigning a save status (SV) to the at least one digital session fingerprint (HS) of the at least one validated session; and emptying the temporary memory of each batch of data packets of the plurality of batches of data packets for which the at least one digital session fingerprint does not have a save status (SV), and saving on a storage memory for subsequent processing all data packets for which the at least one associated digital session fingerprint (HS) has a save status (SV).

2. The method according to claim 1, wherein the activation of the at least one trigger further comprises updating the at least one hash table (TH) saved following the saving the at least one digital session fingerprint (HS), by assigning the save status (SV) to the at least one digital session fingerprint (HS).

3. The method according to claim 1, wherein the emptying the temporary memory further comprises consulting the at least one hash table (TH) to check whether one of the at least one digital session fingerprint (HS) associated with the particular batch of data packets subject to emptying has the save status (SV).

4. The method according to claim 1, wherein the analyzing of the metadata associated with the identified communication protocols (PID) of the particular batch of data packets of the at least one validated session further comprises analyzing the metadata associated with attached content (MP) of the protocol chain of the at least one validated session, wherein the analyzing the metadata associated with the attached content (MP) is based on the at least one trigger's rule for identifying the target metadata (MC) comprising the target metadata (MC) in relation to the attached content (MP).

5. The method according to claim 1, wherein the at least one trigger processes and applies a dynamic list of rules for identifying the target metadata (MC).

6. The method according to claim 1, wherein the target metadata (MC) of identification rules of the at least one trigger belong to a group formed by native metadata and other metadata calculated from selected mathematical formulae.

7. The method according to claim 1, wherein the target metadata (MC) are representative of selected network parameters belonging to a group formed by destination internet protocol (IP), source IP, destination port, source port, protocol, IP address, port, quality of service (QoS) parameters, network tag, session volume, packet size, number of retries, version, encryption algorithm type and version, encryption type, Computer Emergency Response Team (CERT) certificate, Server Name Indication (SNI) value, packet size, returned IP, error flag, domain name, client version, server version, encryption algorithm version, compression algorithm, timestamp, IP version, hostname, leasetime, Uniform Resource Locator (URL), user agent, number of bytes of content attached, content type, status code, cookie header, client name, request service, error code value, request type, protocol value, response timestamp, privilege level, keyboard type and language, product identification, screen size, or any similar specific metadata extracted from the communication protocols in one or more data packets of the at least one validated session, similar specific metadata extracted from content attached to the one or more data packets of the at least one validated session.

8. The method according to claim 1, wherein the performing protocol analysis (DAPD) and the analyzing the metadata of the particular batch of data packets of the at least one validated session (MPID) are carried out on data packets of layer 2 to layer 7 of the Open Systems Interconnection (OSI) model.

9. The method according to claim 1, wherein the at least one trigger is generated following an occurrence of an event during the protocol analysis (DAPD).

10. The method according to claim 9, wherein the trigger generating event occurring during the protocol analysis (DAPD) influences the at least one trigger's rule for identifying the target metadata (MC) and includes a deterioration in a quality of service, a change in a configuration of information technology (IT) peripherals, a change in network capabilities or a security risk.

11. The method according to claim 10, wherein the subsequent processing all data packets for which the at least one associated digital session fingerprint (HS) has the save status (SV) comprises resubmitting the saved data packets for analysis to the (DAPD) to determine whether processing of the saved data packets has resolved or at least mitigated the occurrence of the event.

12. The method according to claim 10, wherein the subsequent processing all data packets for which the at least one associated digital session fingerprint (HS) has the save status (SV) comprises replacing the saved data packets with a set of corrected data packets to resolve or at least mitigate the occurrence of the event.

13. The method according to claim 10, wherein the subsequent processing all data packets for which the at least one associated digital session fingerprint (HS) has the save status (SV) comprises modifying the saved data packets to resolve or at least mitigate the occurrence of the event.

14. A system for processing of a data stream comprising batches of packets, each batch of packets defined by a protocol chain of communication protocols associated with at least one session, comprising:

network interface (NIC) configured to receive the data stream from a communication channel;

a processor comprising at least one processing core for processing a predetermined number of data packets per minute (ppm);

a temporary memory, coupled to the processor, storing a plurality of batches of data packets from the network interface (NIC);

a protocol analysis engine executed on the at least one processing core, wherein the protocol analysis engine is configured to:

receive the plurality of batches of data packets within a predetermined time via the communication channel;

perform, for each batch of data packets of the plurality of batches of data packets, a protocol analysis (DAPD) enabling the communication protocols in the protocol chain to be identified, and validating at least one associated session;

determine at least one digital session fingerprint (HS) associated with the identified protocol chain (PID) of the validated at least one associated session, and store said determined digital session fingerprint (HS) in at least one hash table (TH), and save a list (LM) of metadata (MPID) associated with the identified communication protocols (PID) of the protocol chain of the validated at least one associated session in a knowledge database (BDDS);

a monitoring engine executed on the at least one processing core, wherein the monitoring engine performs:

generating at least one trigger based on the protocol analysis results (DAPD), wherein activation of the at least one trigger is indicative of a match between at least one rule for identifying target metadata (MC) and the list (LM) of metadata (MPID) associated with the identified communication protocols (PID) of the protocol chain of the validated at least one associated session;

analyzing the metadata of a particular batch of data packets of the validated at least one associated session, stored in the temporary memory, against the saved list (LM) of metadata (MPID) associated with the identified communication protocols (PID) in the knowledge database (BDDS), and checking whether the metadata (MPID) associated with the identified communication protocols (PID) comply with the at least one trigger's rule for identifying the target metadata (MC);

determining the metadata comply with the at least one trigger's rule for identifying the target metadata (MC);

activating the at least one trigger and assigning a save status (SV) to at least one digital session fingerprint (HS) of the validated at least one associated session; and emptying the temporary memory for each batch of data packets of the plurality of batches of data packets for which the at least one digital session fingerprint(s) (HS) do not have a save status (SV); and a storage memory coupled to the processor saving, for subsequent processing, all data packets for which the at least one associated digital session fingerprint (HS) has a save status (SV).

15. The system according to claim 14, wherein the monitoring engine is configured to update the at least one hash table (TH) saved following the saving the at least one digital session fingerprint (HS), by assigning the save status (SV) to the at least one digital session fingerprint (HS) based on activation of the at least one trigger.

16. The system according to claim 14, wherein the monitoring engine is configured to consult the at least one hash table (TH) and check whether the at least one digital session fingerprint (HS) associated with the particular batch of data packets of the validated at least one associated session has a save status (SV).

17. The system according to claim 14, wherein the monitoring engine is configured to analyze the metadata associated with attached content (MP) of the protocol chain of the validated at least one associated session during the analysis of the metadata (MPID) associated with the identified communication protocols (PID) of the particular batch of data packets of the validated at least one associated session, wherein the analyzing the metadata associated with the attached content (MP) is based on the at least one trigger's rule for identifying the target metadata (MC) comprising the target metadata (MC) in relation to the attached content (MP).

18. The system according to claim 14, wherein the temporary memory is gradually emptied based on usage of an associated Random Access Memory (RAM) being between 95% and 98%.

19. The system according to claim 14, wherein the temporary memory is emptied chronologically by deleting oldest data packets at a chosen emptying rate.

* * * * *